US012296946B2

(12) United States Patent
Tomimatsu

(10) Patent No.: US 12,296,946 B2
(45) Date of Patent: May 13, 2025

(54) LANDING GEAR

(71) Applicant: HONDA MOTOR CO., LTD., Tokyo (JP)

(72) Inventor: Masaru Tomimatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/449,054

(22) Filed: Aug. 14, 2023

(65) Prior Publication Data

US 2024/0059400 A1 Feb. 22, 2024

(30) Foreign Application Priority Data

Aug. 16, 2022 (JP) .................. 2022-129487

(51) Int. Cl.
*B64C 25/12* (2006.01)
*B64C 25/50* (2006.01)

(52) U.S. Cl.
CPC ............ *B64C 25/12* (2013.01); *B64C 25/505* (2013.01); *B64C 2025/125* (2013.01)

(58) Field of Classification Search
CPC .. B64C 25/12; B64C 25/505; B64C 2025/125
See application file for complete search history.

(56) References Cited

U.S. PATENT DOCUMENTS

| 2,393,110 | A | * | 1/1946 | Kops | B64C 25/505 244/100 R |
| 2,968,455 | A | * | 1/1961 | Smith | B64C 25/505 244/103 R |
| 3,001,741 | A | * | 9/1961 | Rumsey | B64C 25/505 244/50 |
| 3,086,733 | A | | 4/1963 | Hartel | |

* cited by examiner

*Primary Examiner* — Christopher P Ellis
*Assistant Examiner* — Terri L Filosi
(74) *Attorney, Agent, or Firm* — Rankin, Hill & Clark LLP

(57) ABSTRACT

A landing gear includes: a wheel support member including a first portion for rollably supporting a wheel, and a second portion extending from the first portion toward a fuselage in a direction of an axis of the first portion and supporting the first portion such that the first portion is rotatable about the axis; a swing support member for supporting the second portion of the wheel support member such that the second portion is swingable relative to the fuselage; a retraction actuator for swinging the wheel support member to retract the wheel into the fuselage and deploy the wheel from the fuselage; a brace attached to the fuselage and supporting the wheel support member; and a joint connecting the brace to the first portion of the wheel support member. The joint is disposed closer to the wheel than to the swing support member.

6 Claims, 8 Drawing Sheets

LANDING GEAR

CROSS-REFERENCE TO RELATED APPLICATIONS

This application is based upon and claims the benefit of priority from Japanese Patent Application No. 2022-129487 filed on Aug. 16, 2022, the contents of which are incorporated herein by reference.

BACKGROUND OF THE INVENTION

Field of the Invention

The present invention relates to a landing gear of an aircraft.

Description of the Related Art

U.S. Pat. No. 3,086,733 A discloses a landing gear of an aircraft. The landing gear provides for the retraction of the wheel into the fuselage and deployment of the wheel from the fuselage. In this landing gear, the wheel is supported by a wheel support member. The wheel support member includes a strut. The strut includes a cylinder and a piston rod. The piston rod rollably supports the wheel. The cylinder is swingably supported by a swing support member of the fuselage. The cylinder is also supported by a brace. The brace is connected to the cylinder via a collar.

SUMMARY OF THE INVENTION

According to the configuration of U.S. Pat. No. 3,086,733 A, the collar is arranged above the piston rod. In other words, the position of the collar is separated from the wheel in the height direction. Therefore, the bending moment generated in the wheel support member increases. It is preferable that the moment generated in the strut is small.

An object of the present invention is to solve the above-mentioned problem.

According to an aspect of the present invention, there is provided a landing gear comprising: a wheel support member including a first portion configured to rollably support a wheel, and a second portion extending from the first portion toward a fuselage in a direction of an axis of the first portion and configured to support the first portion in a manner so that the first portion is rotatable about the axis; a swing support member configured to support the second portion of the wheel support member in a manner so that the second portion is swingable relative to the fuselage; a retraction actuator configured to swing the wheel support member to retract the wheel into the fuselage and deploy the wheel from the fuselage; a brace attached to the fuselage and configured to support the wheel support member; and a joint configured to connect the brace to the first portion of the wheel support member, wherein the joint is disposed closer to the wheel than to the swing support member.

According to the present invention, the bending moment generated in the wheel support member can be reduced.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

A landing gear 10 described herein is disposed at the nose of an aircraft.

1. First Embodiment

[1-1. Configuration of Landing Gear 10]

Figure 1:
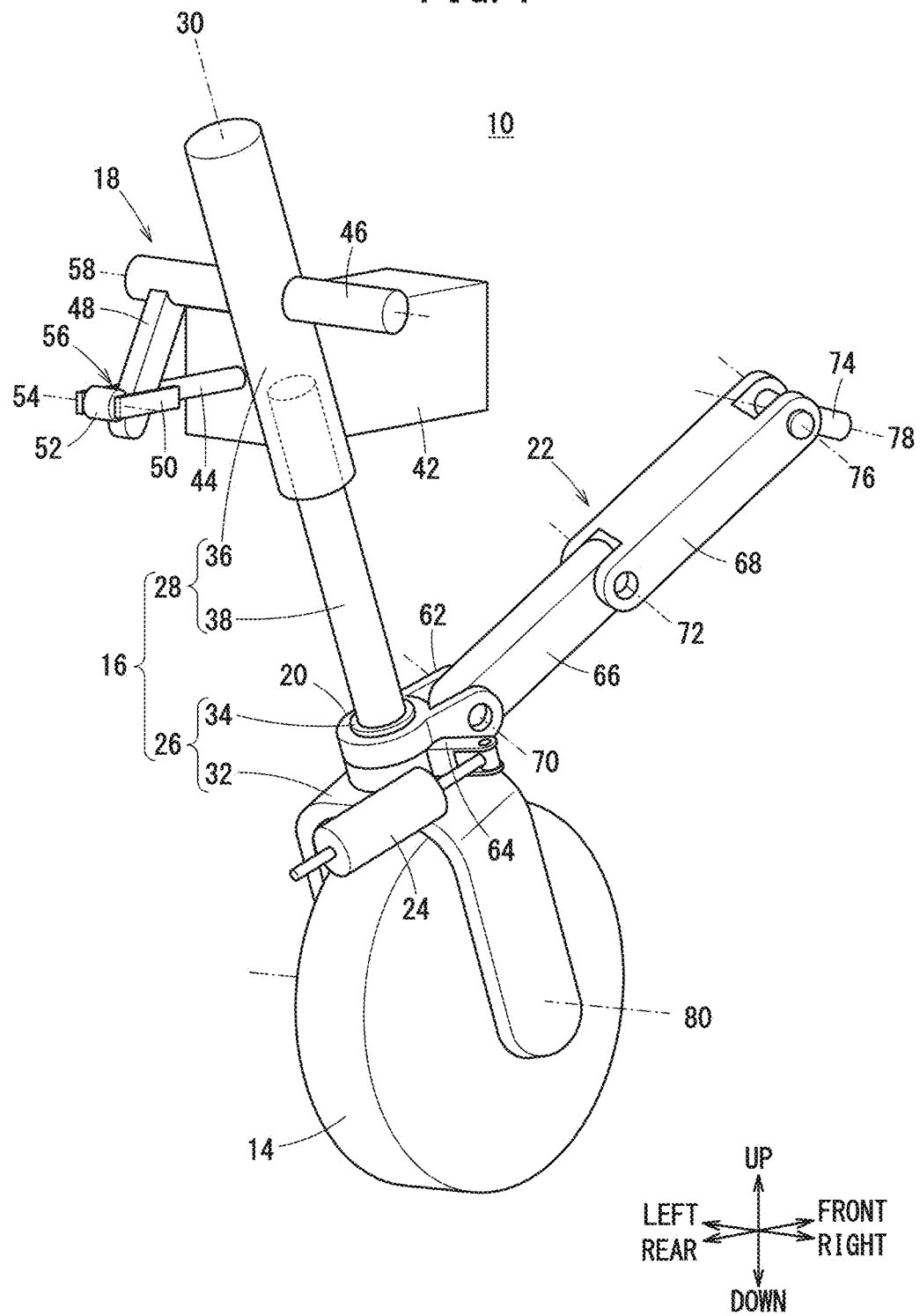
FIG. 1 is a perspective view of a landing gear according to a first embodiment.
Figure 2:
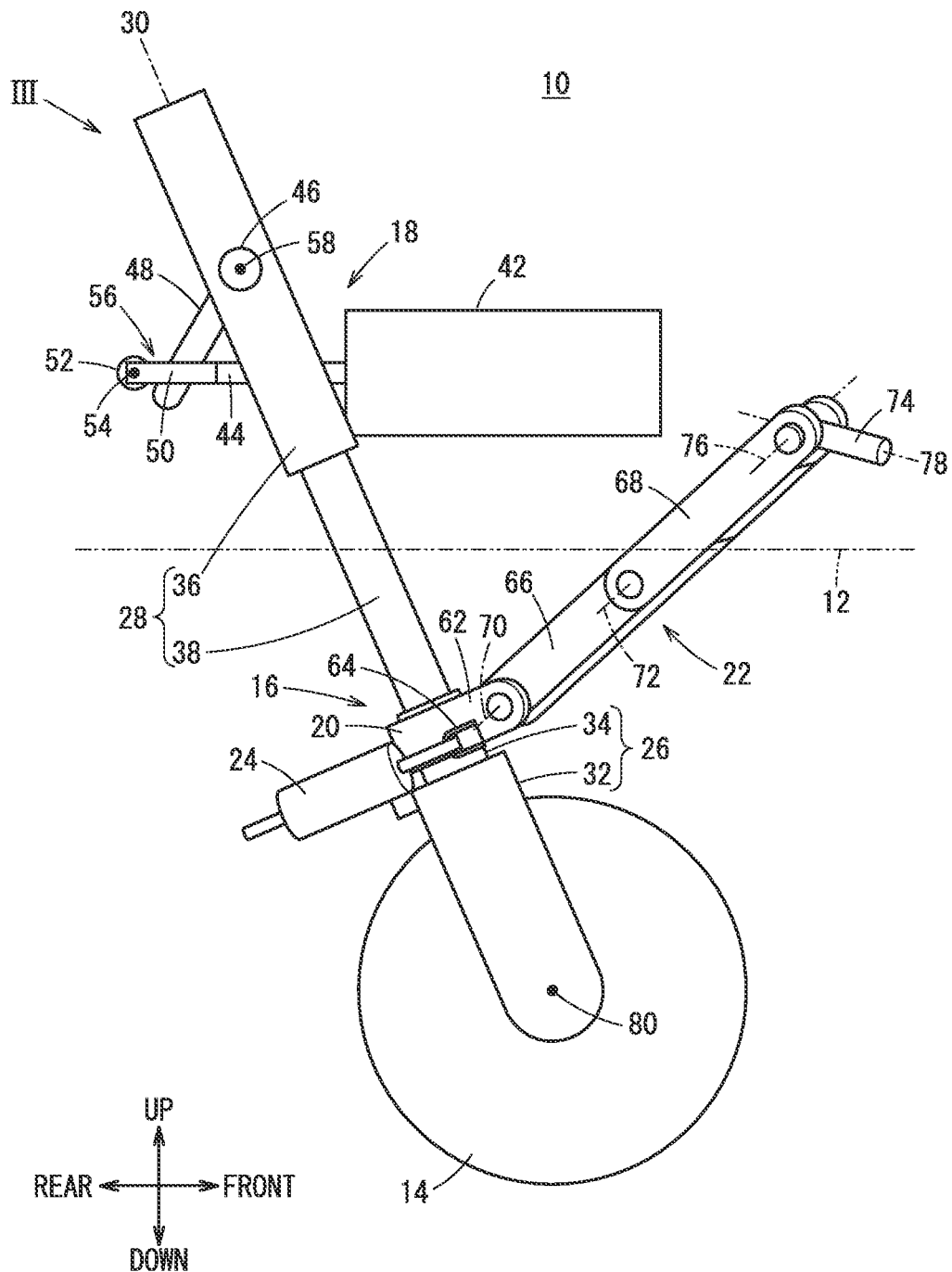
FIG. 2 is a right side view of the landing gear in a state in which a wheel is deployed from a fuselage.
Figure 3:
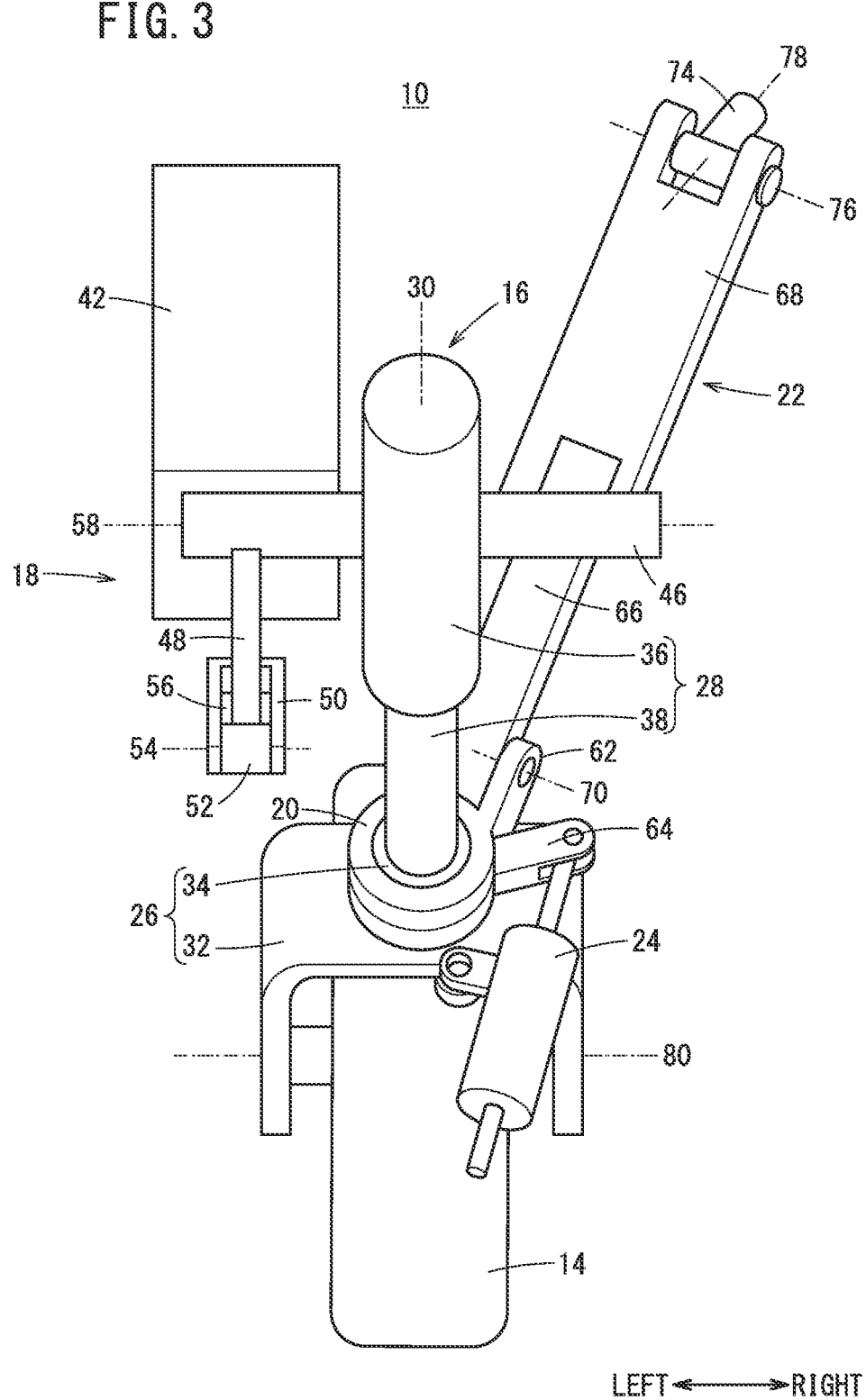
FIG. 3 is a view of the landing gear in a state in which the wheel is deployed from the fuselage, as viewed from an arrow III direction in FIG. 2.
Figure 4:
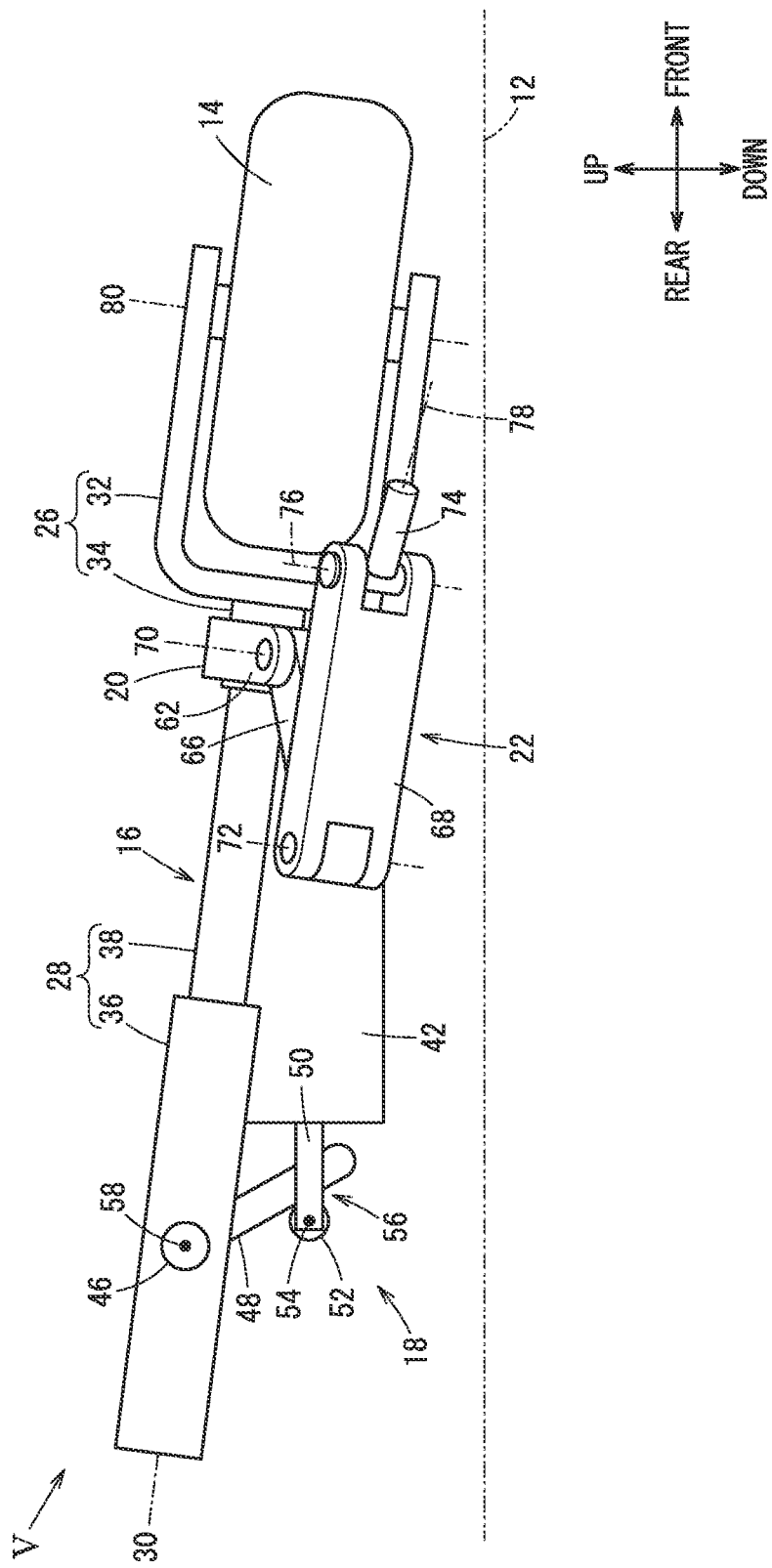
FIG. 4 is a right side view of the landing gear in a state in which the wheel is retracted into the fuselage.
Figure 5:
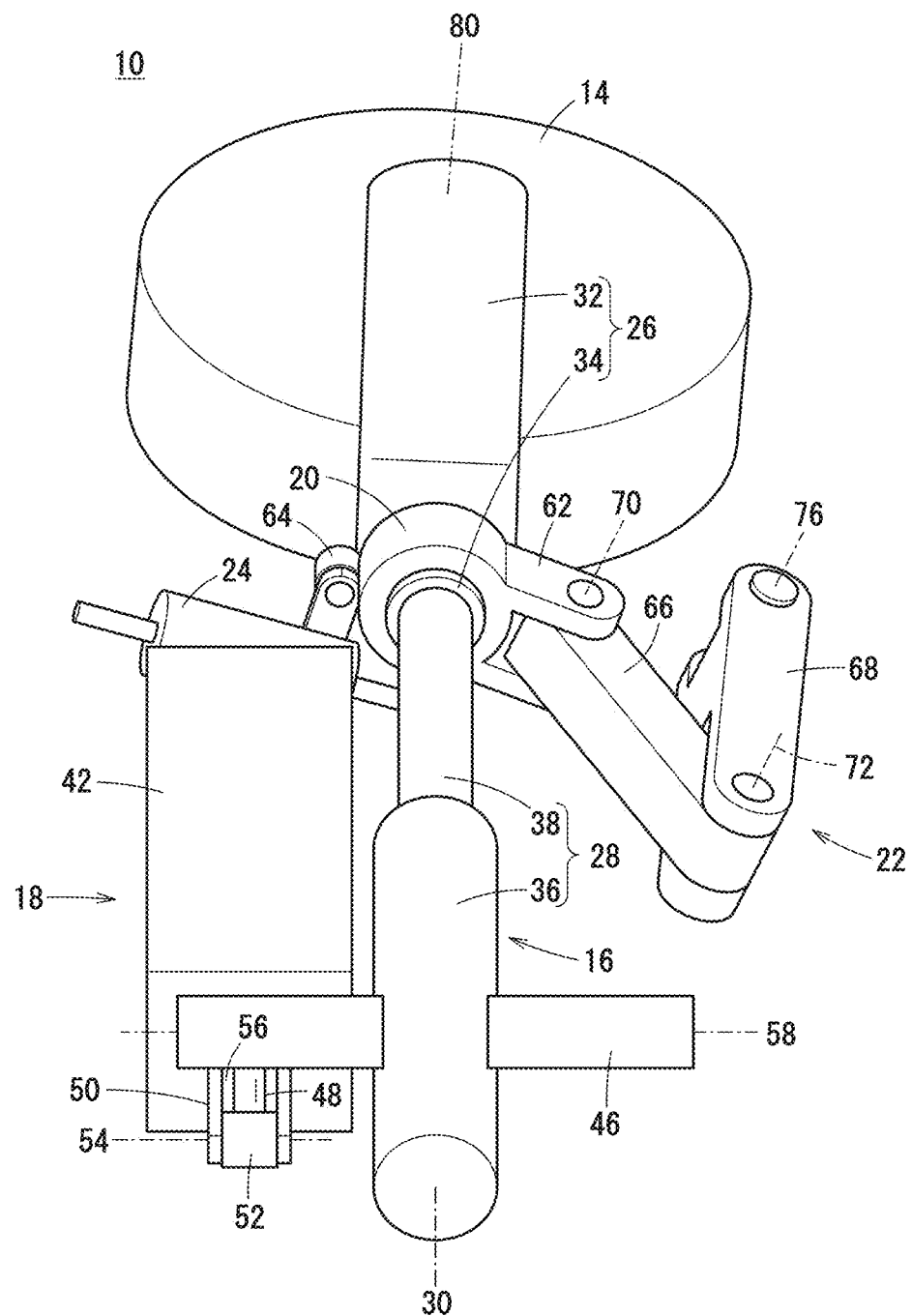
FIG. 5 is a view of the landing gear in a state in which the wheel is retracted into the fuselage, as viewed from an arrow V direction in FIG. 4.

FIG. 1 is a perspective view of the landing gear 10 according to a first embodiment. FIG. 1 is a perspective view of the landing gear 10 in a state in which a wheel 14 is deployed from a fuselage 12. FIG. 2 is a right side view of the landing gear 10 in a state in which the wheel 14 is deployed from the fuselage 12. FIG. 3 is a view of the landing gear 10 in a state in which the wheel 14 is deployed from the fuselage 12, as viewed from an arrow III direction in FIG. 2. FIG. 4 is a right side view of the landing gear 10 in a state in which the wheel 14 is retracted into the fuselage 12. FIG. 5 is a view of the landing gear 10 in a state in which the wheel 14 is retracted into the fuselage 12, as viewed from an arrow V direction in FIG. 4.

The landing gear 10 according to the first embodiment includes the wheel 14, a wheel support member 16, a retraction mechanism 18, a joint 20, a brace 22, and a shimmy damper 24. The aircraft provided with this type of landing gear 10 turns left or right by changing the orientation of a front wheel (the wheel 14) by adjusting the braking force of other landing gears 10 disposed on the left and right rear sides of the fuselage 12 (FIGS. 2 and 4).

The wheel support member 16 rollably supports the wheel 14, and extends from the wheel 14 toward the fuselage 12. The wheel support member 16 is swingable. The wheel support member 16 includes a fork 26 and a strut 28. The respective components of the wheel support member 16 are arranged in the order of the wheel 14, the fork 26, and the strut 28 from the wheel 14 toward the center of swing (a shaft 46 and an axis 58) of the wheel support member 16. The fork 26 and the strut 28 are disposed along an axis 30 of the wheel support member 16. The fork 26 and an inner rod 38 correspond to a first portion of the wheel support member 16, and a cylinder 36 corresponds to a second portion of the wheel support member 16.

The fork 26 includes a shaft portion 34 and a leg portion 32. The leg portion 32 is U-shaped. The leg portion 32 sandwiches the wheel 14 from left and right sides, and rollably supports the wheel 14. Note that the leg portion 32 of the present embodiment is supported at both ends, but may be cantilevered. The shaft portion 34 extends from a central portion of the leg portion 32 in the left-right direction toward the strut 28. The shaft portion 34 has a cylindrical shape.

The strut 28 is a damper including the cylinder 36 and the inner rod 38. The respective components of the strut 28 are arranged in the order of the inner rod 38 and the cylinder 36 from the fork 26 toward the center of swing (the shaft 46 and the axis 58) of the wheel support member 16. The cylinder 36 and the inner rod 38 are disposed along the axis 30. The cylinder 36 is swingably supported by the shaft 46 of the retraction mechanism 18. The inner rod 38 is partially housed in the cylinder 36. An end portion of the inner rod 38 that is disposed outside the cylinder 36 is fitted and fixed to the shaft portion 34 of the fork 26. The inner rod 38 is guided by the cylinder 36. The inner rod 38 can reciprocate in the cylinder 36 along the axis 30. Further, the inner rod 38 can rotate in the cylinder 36 about the axis 30.

The retraction mechanism 18 includes a retraction actuator 42, a rod portion 44, the shaft 46 (a swing support member), and an arm 48. As shown in FIG. 3, in the left-right direction (the width direction of the fuselage 12), the retraction actuator 42 is disposed so as to be shifted to either the left or the right from the wheel support member 16 and the wheel 14. In the present embodiment, the retraction actuator 42 is disposed on the left side of the wheel support member 16 and the wheel 14. The retraction actuator 42 is an electric actuator or a hydraulic actuator. The retraction actuator 42 moves the rod portion 44 in the front-rear direction of the aircraft. The rod portion 44 extends in the front-rear direction of the aircraft. A front end portion of the rod portion 44 is connected to the retraction actuator 42. A rear end portion of the rod portion 44 has a branch portion 50 branched into two parts. The branch portion 50 sandwiches a roller 52 from left and right sides and rotatably supports the roller 52. The roller 52 is rotatable about an axis 54 extending in the left-right direction. In front of the roller 52, a hole 56 is formed by the branch portion 50 and the roller 52.

The shaft 46 is attached to the cylinder 36. The shaft 46 extends in the left-right direction. The shaft 46 is formed of two members attached to the left and right sides of the cylinder 36, respectively. By being supported by the fuselage 12, the shaft 46 is rotatable about the axis 58 extending in the left-right direction. As a result, the wheel support member 16 can swing about the shaft 46 (the axis 58) relative to the fuselage 12. The arm 48 extends from the shaft 46 disposed on the left side of the cylinder 36 toward the hole 56. A distal end portion of the arm 48 is inserted into the hole 56. The back surface of the distal end portion of the arm 48 can abut against the roller 52.

The joint 20 connects the brace 22 to the wheel support member 16. The joint 20 is disposed closer to the wheel 14 than to the shaft 46 serving as the swing center. In the present embodiment, the joint 20 is rotatably attached around the shaft portion 34 of the fork 26. Thus, the joint 20 connects the brace 22 to the shaft portion 34. Note that the joint 20 may be rotatably attached around the inner rod 38. In this case, the joint 20 connects the brace 22 to the inner rod 38. In the configuration in which the joint 20 is attached to the inner rod 38, the joint 20 is preferably arranged closer to the fork 26 than to the cylinder 36. For example, the joint 20 is preferably arranged at the distal end of the inner rod 38 and proximate to the fork 26. The joint 20 has an annular shape and is fitted to the outer peripheral surface of the shaft portion 34. The joint 20 is rotatable about the axis 30 relative to the shaft portion 34. The joint 20 includes a first support portion 62 and a second support portion 64. The first support portion 62 rotatably supports the brace 22. The second support portion 64 rotatably supports the shimmy damper 24.

The brace 22 is a link mechanism. The brace 22 includes a lower portion 66 and an upper portion 68 corresponding to links. The lower portion 66 is connected to the first support portion 62 of the joint 20. The lower portion 66 is rotatable about an axis 70 of the first support portion 62. The axis 70 is orthogonal to a direction parallel to the axis 30, and is orthogonal to a radial direction of the joint 20. The upper portion 68 is connected to the lower portion 66. The upper portion 68 is rotatable about an axis 72 of a joint portion between the upper portion 68 and the lower portion 66. The axis 72 and the axis 70 are parallel to each other. Further, the upper portion 68 is connected to a joint 74. The joint 74 is connected to the fuselage 12. The upper portion 68 is rotatable about an axis 76 of a joint portion between the upper portion 68 and the joint 74. Further, the upper portion 68 is rotatable about an axis 78 of the joint 74. The axis 76 and the axis 72 are parallel to each other. As shown in FIGS. 1 to 3, the brace 22 is extended in a state in which the wheel 14 is deployed from the fuselage 12. On the other hand, as shown in FIGS. 4 and 5, the brace 22 is folded in a state in which the wheel 14 is retracted into the fuselage 12. As shown in FIG. 3, the joint 74 is disposed on the right side of the wheel support member 16 and the wheel 14 in the left-right direction (the width direction of the fuselage 12).

For example, as shown in FIG. 3, the shimmy damper 24 is attached to the fork 26 and the second support portion 64 of the joint 20. The shimmy damper 24 stabilizes the orientation of the wheel 14 when a lateral force is generated in the wheel 14. Further, the shimmy damper 24 generates a restoring force for returning the wheel 14 to its original posture when the wheel 14 swings left and right.

[1-2. Operation of Landing Gear 10]

The landing gear 10 retracts the wheel 14 from the outside to the inside of the fuselage 12 in the following manner.

From the state shown in FIGS. 1 to 3, the retraction actuator 42 moves the rod portion 44 forward. The roller 52 pushes the arm 48 forward. As the arm 48 moves forward, the shaft 46 rotates counterclockwise when viewed from the right side. Then, the wheel support member 16 and the wheel 14 swing counterclockwise when viewed from the right side. As the retraction actuator 42 continues to operate, the wheel support member 16 and the wheel 14 gradually approach the fuselage 12. As shown in FIGS. 4 and 5, the wheel support member 16 and the wheel 14 are finally retracted into the fuselage 12.

In accordance with the swing of the wheel support member 16 in a process of retracting the wheel 14, the lower portion 66 and the upper portion 68 of the brace 22 rotate about the respective axes (the axis 70, the axis 72, the axis 76, and the axis 78). As a result, the brace 22 is gradually folded.

The joint 20 is connected to the brace 22. Therefore, in accordance with the swing of the wheel support member 16 in the process of retracting the wheel 14, a force rotating about the axis 30 is applied to the joint 20. Specifically, a force in a clockwise direction as viewed from the position of the strut 28 is applied to the joint 20. The joint 20 and the fork 26 are connected to each other via the shimmy damper 24. Accordingly, the joint 20, the shimmy damper 24, the fork 26, the wheel 14, and the inner rod 38 integrally rotate about the axis 30 relative to the cylinder 36. Therefore, as shown in FIG. 4, the wheel 14 is retracted into the fuselage 12 in a state in which a rolling axis 80 of the wheel 14 extends substantially in the up-down direction.

[1-3. Effect of Landing Gear 10]

Figure 6:
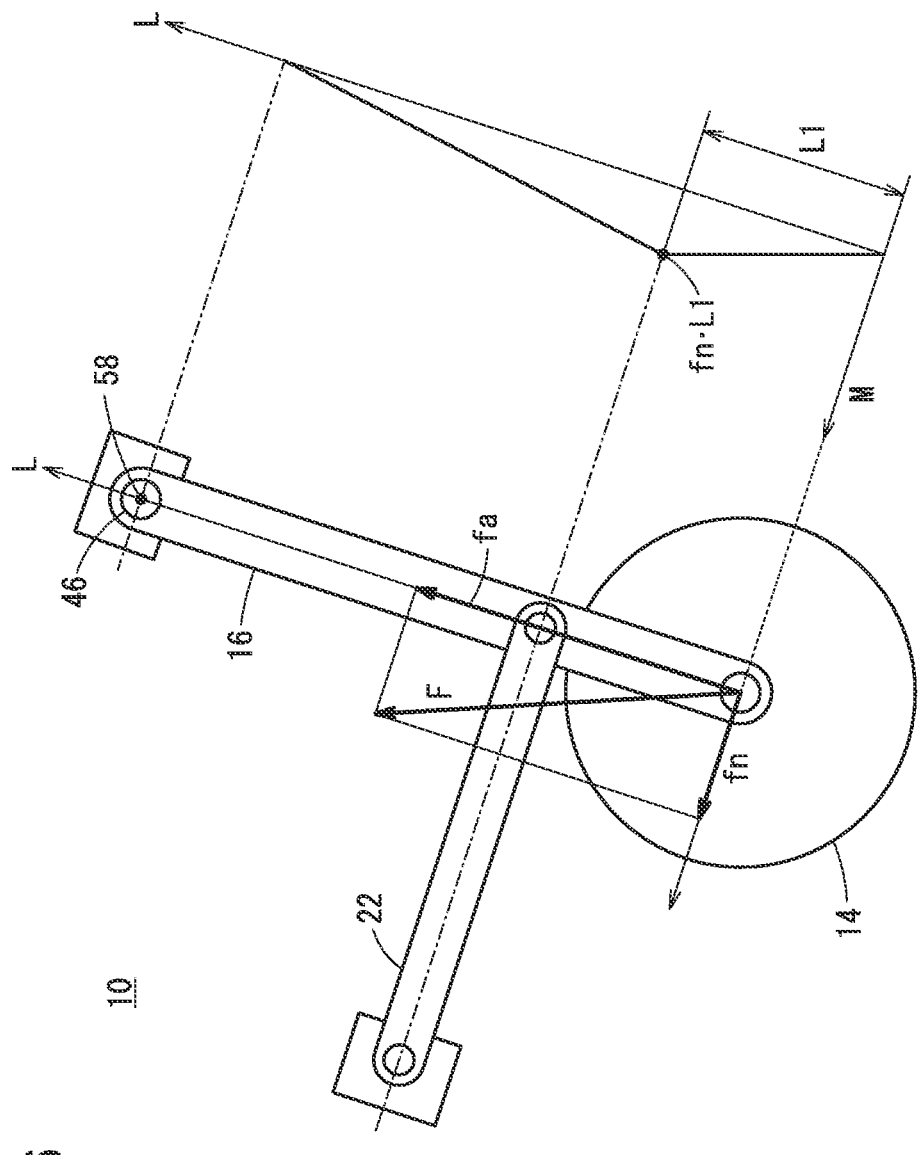
FIG. 6 is a schematic view for explaining a bending moment acting on a wheel support member of the landing gear according to the first embodiment.
Figure 7:
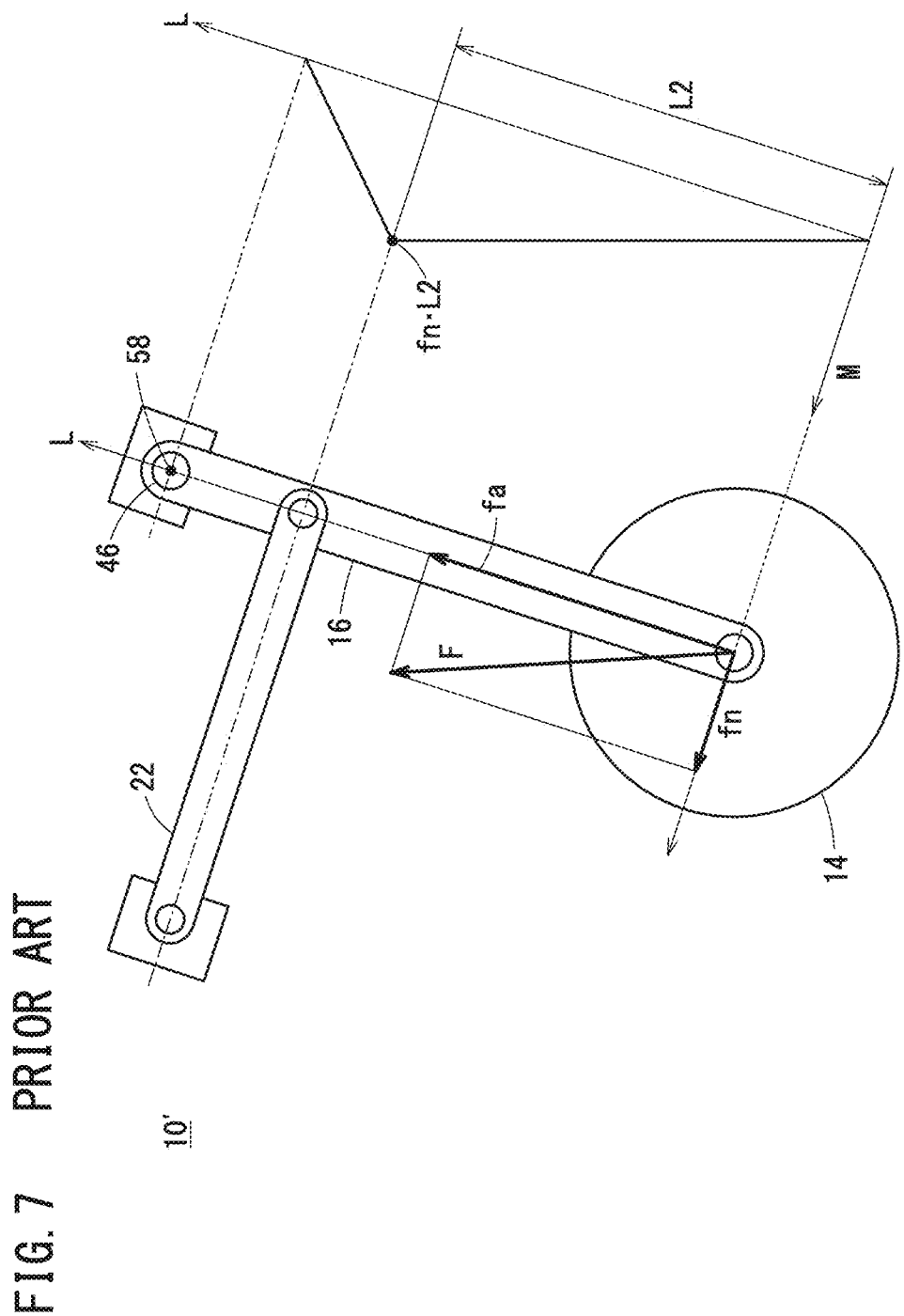
FIG. 7 is a schematic view for explaining a bending moment acting on a wheel support member of a conventional landing gear.

FIG. 6 is a schematic view for explaining a bending moment acting on the wheel support member 16 of the landing gear 10 according to the first embodiment. FIG. 7 is a schematic view for explaining a bending moment acting on the wheel support member 16 of a landing gear 10' of a comparative example. FIG. 7 schematically shows the structure of the conventional landing gear. As can be seen from a comparison between FIGS. 6 and 7, in the landing gear 10, a length L1 from the center of the wheel 14 to a connection point between the wheel support member 16 and the brace 22 (the position of the joint 20) is shorter than a length L2 from the center of the wheel 14 of the landing gear 10' to a connection point between the wheel support member 16 and the brace 22 (the position of the joint 20).

As shown in FIGS. 6 and 7, an upward load F is applied to the wheel 14. The load F is divided into a component fa in the direction of the axis 30 of the wheel support member 16 and a component fn orthogonal to the component fa. In the landing gear 10, a bending moment fn·L1 is generated in the wheel support member 16. In the conventional landing gear 10', a bending moment fn·L2 is generated in the wheel support member 16. As described above, since the length L1 in the landing gear 10 is shorter than the length L2 in the landing gear 10', the bending moment fn·L1 is smaller than the bending moment fn·L2. Therefore, according to the first embodiment, the bending moment acting on the wheel support member 16 can be reduced.

According to the first embodiment, the following effect can also be obtained. For example, apart from the first embodiment, there is a landing gear in which the joint 20 is disposed on the cylinder 36. In such a landing gear, a member (a torque arm or the like) connecting the joint 20 and the fork 26 is required in order to rotate the wheel 14 about the axis of the wheel support member 16 in accordance with the retraction (and deployment) of the wheel 14. On the other hand, in the first embodiment, the joint 20 is disposed on the inner rod 38 or the fork 26. According to the first embodiment, it is not necessary to provide a member such as a torque arm in the wheel support member 16. Therefore, according to the first embodiment, it is possible to suppress an increase in weight of the fuselage 12.

2. Second Embodiment

Figure 8:
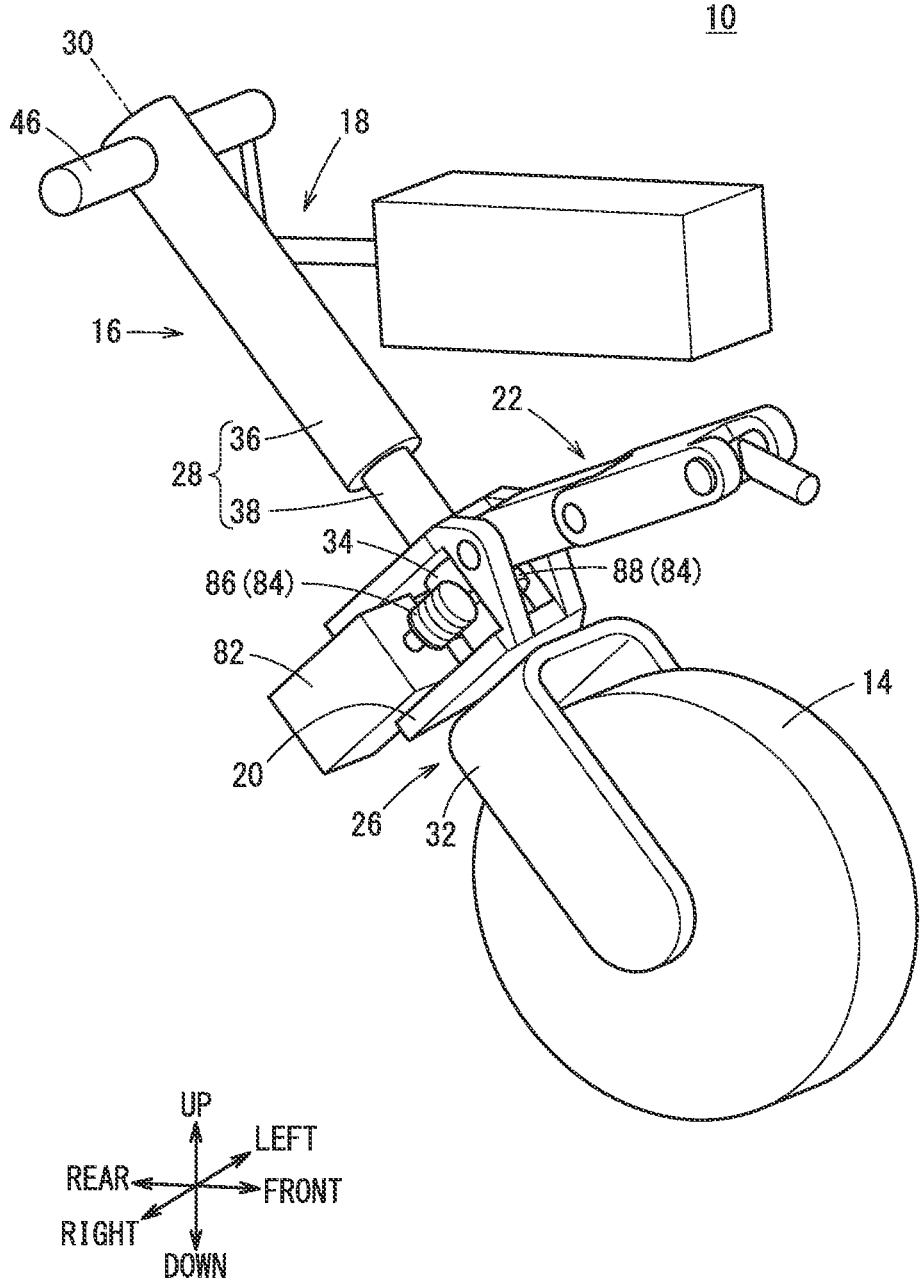
FIG. 8 is a perspective view of the landing gear according to a second embodiment.

FIG. 8 is a perspective view of the landing gear 10 according to a second embodiment. FIG. 8 is a perspective view of the landing gear 10 in a state in which the wheel 14 is deployed from the fuselage 12. In FIG. 8, the same components as those in the first embodiment are denoted by the same reference numerals, or the reference numerals of the same components as those in the first embodiment are omitted.

The landing gear 10 according to the second embodiment includes the wheel 14, the wheel support member 16, the retraction mechanism 18, the brace 22, the joint 20, a steering actuator 82, and a worm gear 84. The aircraft provided with this type of landing gear 10 steers by controlling the steering actuator 82.

The steering actuator 82 is fixed to the joint 20. A worm 86 of the worm gear 84 is fixed to the rotation shaft of the steering actuator 82. On the other hand, a worm wheel 88 of the worm gear 84 is fixed around the shaft portion 34 of the fork 26.

When the steering actuator 82 operates, the worm 86 rotates, and the worm wheel 88 rotates about the axis 30. In accordance with the rotation of the worm wheel 88, the fork 26 and the wheel 14 rotate about the axis 30. As a result, the wheel 14 is steered.

In the second embodiment, as in the first embodiment, the joint 20 is attached around the shaft portion 34 of the fork 26. Therefore, according to the second embodiment, the same effect as that of the first embodiment can be obtained.

3. Invention Obtained from Embodiments

The invention that can be grasped from the above embodiments will be described below.

According to an aspect of the present invention, provided is the landing gear (10) including: the wheel support member (16) including the first portion (26, 38) configured to rollably support the wheel (14), and the second portion (36) extending from the first portion toward the fuselage (12) in the direction of the axis (30) of the first portion, and configured to support the first portion in a manner so that the first portion is rotatable about the axis; the swing support member (46) configured to support the second portion of the wheel support member in a manner so that the second portion is swingable relative to the fuselage; the retraction actuator (42) configured to swing the wheel support member to retract the wheel into the fuselage and deploy the wheel from the fuselage; the brace (22) attached to the fuselage and configured to support the wheel support member; and the joint (20) configured to connect the brace to the first portion of the wheel support member, wherein the joint is disposed closer to the wheel than to the swing support member.

According to the above configuration, the moment generated in the wheel support member can be reduced.

In the aspect of the present invention, the wheel support member includes the fork (26) configured to rollably support the wheel, and the strut (28) extending from the fork to the fuselage, the strut is a damper including the cylinder and the inner rod, the fork and the inner rod form the first portion, the cylinder forms the second portion, the inner rod is connected to the fork, the joint is disposed on the fork and is rotatable about the axis relative to the fork, and the shimmy damper (24) is attached to the fork and the joint, the shimmy damper being configured to stabilize the orientation of the wheel when a lateral force is generated in the wheel, and generate a restoring force for returning the wheel to the original posture of the wheel when the wheel swings left and right.

According to the above configuration, since it is not necessary to provide a member such as a torque arm in the wheel support member, it is possible to suppress an increase in weight of the fuselage.

In the aspect of the present invention, the wheel support member includes the fork configured to rollably support the wheel, and the strut extending from the fork to the fuselage, the strut is a damper including the cylinder and the inner rod, the fork and the inner rod form the first portion, the cylinder forms the second portion, the inner rod is connected to the fork, the joint is disposed on the fork and is rotatable about the axis relative to the fork, and the steering actuator (82) is attached to the joint, the steering actuator being configured to steer the wheel by changing the orientation of the fork relative to the joint.

According to the above configuration, since it is not necessary to provide a member such as a torque arm in the wheel support member, it is possible to suppress an increase in weight of the fuselage.

In the aspect of the present invention, the wheel support member includes the fork configured to rollably support the wheel, and the strut extending from the fork to the fuselage, the strut is a damper including the cylinder (36) and the inner rod (38), the fork and the inner rod form the first portion, the cylinder forms the second portion, the inner rod is connected to the fork, the joint is disposed at a location on the inner rod, the location being closer to the fork than to the cylinder, and the joint is rotatable about the axis relative to the inner rod, and the shimmy damper is attached to the fork and the joint, the shimmy damper being configured to stabilize the orientation of the wheel when a lateral force is generated in the wheel, and generate a restoring force for returning the wheel to the original posture of the wheel when the wheel swings left and right.

According to the above configuration, since it is not necessary to provide a member such as a torque arm in the wheel support member, it is possible to suppress an increase in weight of the fuselage.

In the aspect of the present invention, the wheel support member includes the fork configured to rollably support the wheel, and the strut extending from the fork to the fuselage, the strut is a damper including the cylinder and the inner rod, the fork and the inner rod form the first portion, the cylinder forms the second portion, the inner rod is connected to the fork, the joint is disposed at a location on the inner rod, the location being closer to the fork than to the cylinder, and the joint is rotatable about the axis relative to the inner rod, and the steering actuator is attached to the joint, the steering actuator being configured to steer the wheel by changing the orientation of the fork relative to the joint.

According to the above configuration, since it is not necessary to provide a member such as a torque arm in the wheel support member, it is possible to suppress an increase in weight of the fuselage.

In the aspect of the present invention, in the width direction of the fuselage, the wheel support member and the wheel may be disposed between the retraction actuator and the portion where the brace is connected to the fuselage.

Note that the present invention is not limited to the above disclosure, and various modifications are possible without departing from the essence and gist of the present invention.

The invention claimed is:

1. A landing gear comprising:
   a wheel support member including a first portion configured to rollably support a wheel, and a second portion extending from the first portion toward a fuselage in a direction of an axis of the first portion and configured to support the first portion in a manner so that the first portion is rotatable about the axis;
   a swing support member configured to support the second portion of the wheel support member in a manner so that the second portion is swingable relative to the fuselage;
   a retraction actuator configured to swing the wheel support member to retract the wheel into the fuselage and deploy the wheel from the fuselage;
   a brace attached to the fuselage and configured to support the wheel support member; and
   a joint configured to connect the brace to the first portion of the wheel support member,
   wherein the joint is disposed closer to the wheel than to the swing support member.

2. The landing gear according to claim 1, wherein the wheel support member includes:
   a fork configured to rollably support the wheel; and
   a strut extending from the fork to the fuselage,
   the strut is a damper including a cylinder and an inner rod,
   the fork and the inner rod form the first portion,
   the cylinder forms the second portion,
   the inner rod is connected to the fork,
   the joint is disposed on the fork and is rotatable about the axis relative to the fork, and
   a shimmy damper is attached to the fork and the joint, the shimmy damper being configured to stabilize an orientation of the wheel when a lateral force is generated in the wheel, and generate a restoring force for returning the wheel to an original posture of the wheel when the wheel swings left and right.

3. The landing gear according to claim 1, wherein the wheel support member includes:
   a fork configured to rollably support the wheel; and
   a strut extending from the fork to the fuselage,
   the strut is a damper including a cylinder and an inner rod,
   the fork and the inner rod form the first portion,
   the cylinder forms the second portion,
   the inner rod is connected to the fork,
   the joint is disposed on the fork and is rotatable about the axis relative to the fork, and
   a steering actuator is attached to the joint, the steering actuator being configured to steer the wheel by changing an orientation of the fork relative to the joint.

4. The landing gear according to claim 1, wherein the wheel support member includes:
   a fork configured to rollably support the wheel; and
   a strut extending from the fork to the fuselage,
   the strut is a damper including a cylinder and an inner rod,
   the fork and the inner rod form the first portion,
   the cylinder forms the second portion,
   the inner rod is connected to the fork,
   the joint is disposed at a location on the inner rod, the location being closer to the fork than to the cylinder, and the joint is rotatable about the axis relative to the inner rod, and
   a shimmy damper is attached to the fork and the joint, the shimmy damper being configured to stabilize an orientation of the wheel when a lateral force is generated in the wheel, and generate a restoring force for returning the wheel to an original posture of the wheel when the wheel swings left and right.

5. The landing gear according to claim 1, wherein the wheel support member includes:
   a fork configured to rollably support the wheel; and
   a strut extending from the fork to the fuselage,
   the strut is a damper including a cylinder and an inner rod,
   the fork and the inner rod form the first portion,
   the cylinder forms the second portion,
   the inner rod is connected to the fork,
   the joint is disposed at a location on the inner rod, the location being closer to the fork than to the cylinder, and the joint is rotatable about the axis relative to the inner rod, and
   a steering actuator is attached to the joint, the steering actuator being configured to steer the wheel by changing an orientation of the fork relative to the joint.

6. The landing gear according to claim 1, wherein in a width direction of the fuselage, the wheel support member and the wheel are disposed between the retraction actuator and a portion where the brace is connected to the fuselage.

* * * * *